Figure 1:
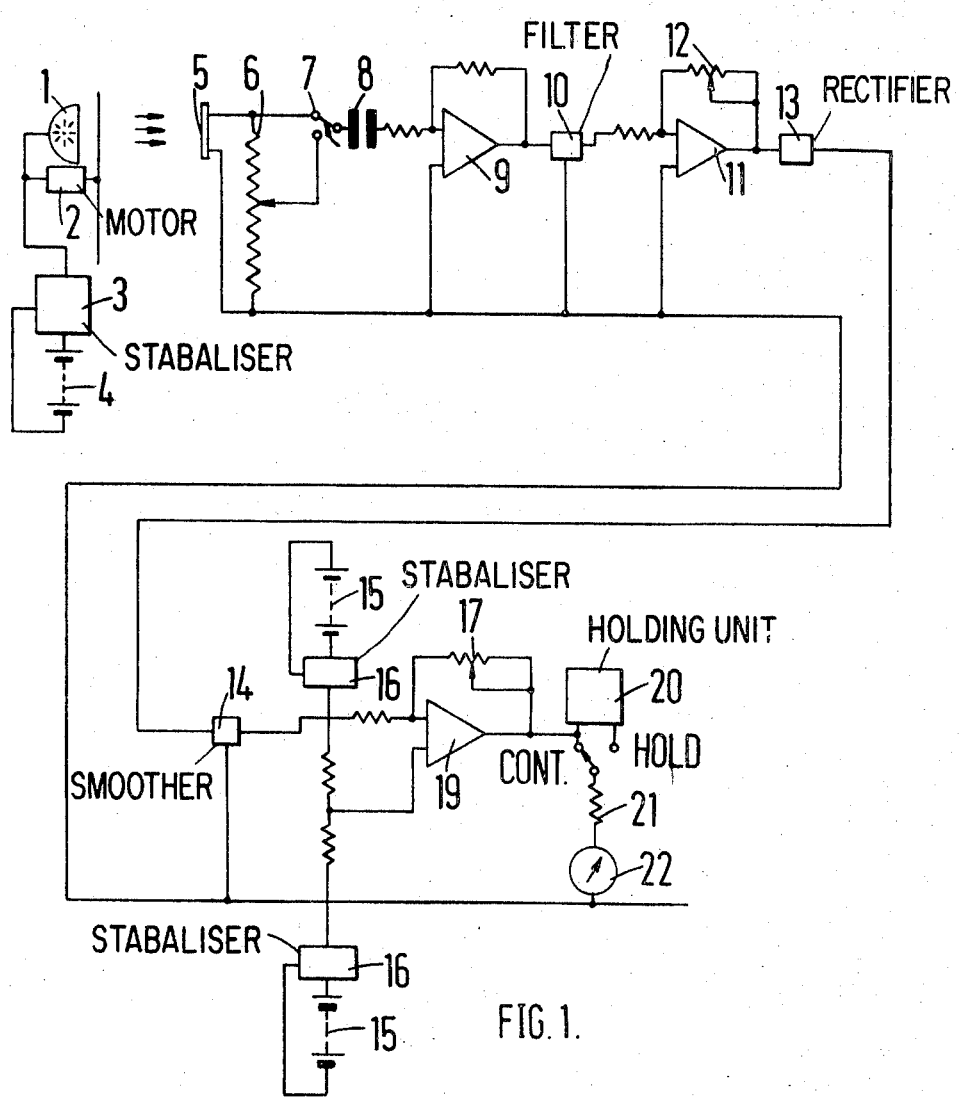

United States Patent [19]

Littlewood, deceased

[11] 3,843,266

[45] Oct. 22, 1974

[54] OPACIMETERS

[76] Inventor: Arnold Littlewood, deceased, late of 43 Stotfold Rd., Hitchin, England by Esther Littlewood, personal representative

[22] Filed: Feb. 6, 1973

[21] Appl. No.: 330,107

[30] Foreign Application Priority Data
Feb. 9, 1972  Great Britain...................... 6105/72

[52] U.S. Cl................................ 356/207, 250/573
[51] Int. Cl. ........................................ G01n 21/12
[58] Field of Search ............ 356/207, 208; 328/146

[56] References Cited
UNITED STATES PATENTS

| 2,860,241 | 11/1958 | Post | 328/146 X |
|---|---|---|---|
| 3,618,061 | 11/1971 | Livers | 356/208 X |
| 3,632,209 | 1/1972 | Kingman | 356/207 X |
| 3,711,210 | 1/1973 | Krukowski | 356/207 |

Primary Examiner—Ronald L. Wibert
Assistant Examiner—Matthew W. Koren
Attorney, Agent, or Firm—Cushman, Darby & Cushman

[57] ABSTRACT

The invention concerns opacimeters for measuring smoke emission, particularly from internal combustion engines. The device provides facility both for continuous and peak emission and includes a chopped light source and a photocell between which the smoke to be measured can pass, together with circuitry for amplifying, smoothing and rectifying the photocell output. The rectified signal is supplied to one input of a differential amplifier the other input of which is supplied with a reference voltage. A hold device is provided for peak measurement.

4 Claims, 4 Drawing Figures

OPACIMETERS

The present invention concerns opacimeters for measuring the smoke emission from internal combustion engines. A known and widely used smokemeter is of the sampling type. The sampling method is to use the exhaust pressure to force a sample through the meter; sometimes this pressure needs to be modified by an adjustable exhaust restriction. Any sampling method has the disadvantage that precautions have to be taken to ensure that the sampling is isokinetic and that the distribution of pressures in the system allows sampling at a steady rate and does not permit smoke to be deposited to interfere with the measurement. Furthermore, transient smoke measurements with this type of instrument are not recommended because the response to transient "bursts" is limited by the filling time of the sampling tube (transport time approximately 0.2 – 0.6s) and by the length of tube which inevitably integrates the sample.

Measurement of these "bursts" can be used as the criterion of the effectiveness of an opacimeter for roadside testing.

According to the present invention, there is provided an opacimeter comprising a source of light; means for chopping the beam of light; a photoelectric cell arranged to receive the chopped beam; means for causing the smoke, the opacity of which is to be measured, to pass between the source of light and the photoelectric cell; means for amplifying, rectifying and smoothing the output of the photoelectric cell; means for measuring this output continuously on a meter or recorder and means for making peak measurements on the same meter or recorder using a hold device.

Preferably the source of light is a tungsten halogen lamp and the photoelectric cell is a selenium photovoltaic cell since this combination has the same spectral characteristics as ocular vision.

Figure 2A:
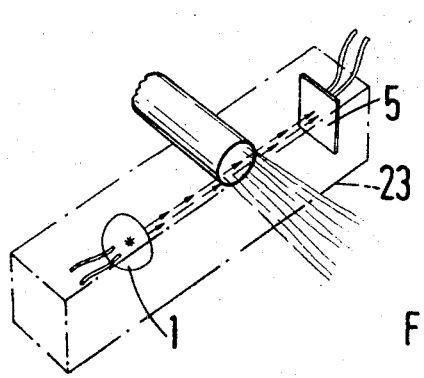
Figure 2A:
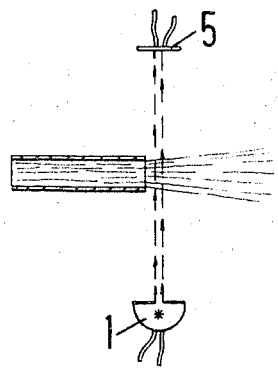
Figure 3A:
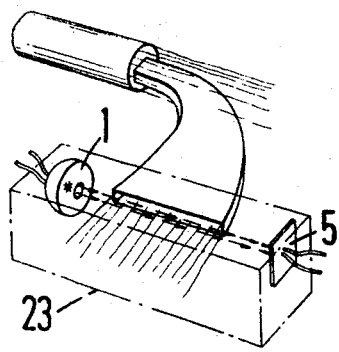
Figure 3A:
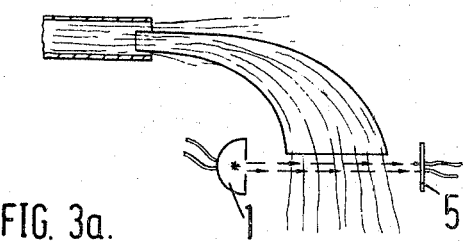
Figure 4A:
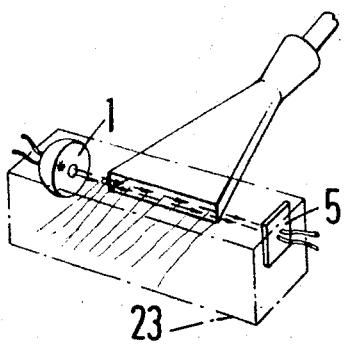
Figure 4A:
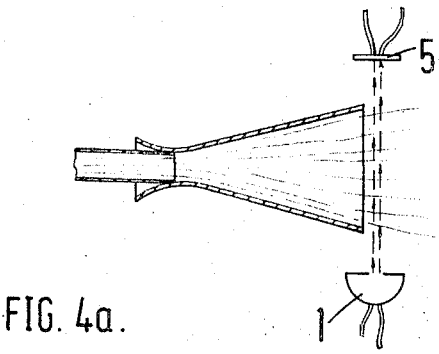

An embodiment of the present invention will now be described by way of example and with reference to the accompanying drawings, in which:

FIG. 1 is a circuit diagram of an opacimeter constructed in accordance with the present invention, and FIGS. 2a and 3a and 4a show schematically alternative ways of using the meter to measure smoke from the exhaust of a vehicle under test.

In the embodiment of FIG. 2a, the opacimeter, the outline of which is generally indicated at 23, is arranged so that it can be fitted directly across the end of the exhaust pipe of a vehicle being tested, where the measurement path length is the internal diameter of the exhaust pipe. FIG. 3a shows a system in which the meter is used in what is, in effect, a sampling mode in which some of the smoke is directed into the opacimeter by an essentially funnel shaped device. This system has the advantage that it increases the path length to a suitable constant value. However, FIG. 4a shows a preferred system for providing this constant path length while still preserving genuine "full-flow" conditions of measurement. Although the length of the 'fishtail' aperture is constant, being the measurement path length, the width is chosen to preserve the terminal cross-sectional area of the exhaust system of the vehicle being tested.

Referring to FIG. 1, the opacimeter comprises a 6 volt 10 watt tungsten halogen lamp 1. Light from the lamp 1 is chopped at 1 KHz(nominal) either by a chopper driven by an electric motor 2 or by an electro-optical chopper in the form of a nematic liquid crystal window. A 6 volt supply for the chopper motor 2 and the lamp 1 is supplied by a 12 volt battery 4 via a stabiliser 3. Light from the lamp 1 is directed on to a selenium photovoltaic cell 5 and smoke from the exhaust pipe is arranged to pass between the lamp 1 and the cell 5 so that the output of the latter varies with the obscuration caused by the smoke. However, it is important that the smoke does not directly impinge on the lamp or cell. It should also be realised that the optical path length of that part of the beam that is not obscured by smoke is not critical, but should be as short as possible.

A resistive load 6 of 100 ohms linearises the output of the cell 5 and a switch 7 is provided, the purpose of which will be described later. The d.c. level of the output signal from the cell 5, caused by ambient light, is removed by a capacitor 8, and the resulting a.c. signal is applied to the input of the fixed gain a.c. preamplifier 9, and then to a variable gain amplifier 11 controlled by a potentiometer 12. A 100 Hz rejection filter 10 may be incorporated to eliminate possible effects of artificial ambient light. The output of amplifier 11 is rectified at 13 and smoothed at 14. The smoothed rectified signal and a fixed reference potential are applied differentially to a variable gain d.c. amplifier 19, the gain of amplifier 19 being controlled either manually by potentiometer 17 or by automatic means to be described. The fixed reference potential is derived from a resistance chain across the main stabilised power supply for the amplifiers. This power supply may consist either of two sets of dry batteries 15 operating via a pair of stabilisers 16, or the aforementioned battery 4 operating via a stabilised dual output d.c./d.c. converter unit. A milliammeter 22 is connected through a two position switch 21 to measure either the output of the amplifier directly or through a holding unit 20 for peak smoke measurement. Battery state indicators are also provided.

The function of potentiometer 12, in conjunction with switch 7, is to enable zero smoke to be set at zero of the meter 22. The gain of amplifier 19 is varied to enable the maximum smoke value for any chosen opacity range to be set at full scale of the meter 22 for the particular path length in use. This manual gain setting is made either by a continuously variable potentiometer 17 or, for mode 2a use and when only one opacity range is required, by a switch which selects from a number of predetermined resistance values corresponding to exhaust pipe internal diameters in common use. The various full scale gain settings may be checked and/or calibrated either by interposing neutral density optical filters in the light path or, more conveniently, by adjustment of the 100 ohm potentiometer 6 in conjunction with switch 7 to produce known electrical attenuation of the signal from photocell 5 under steady zero-smoke conditions. If required, the gain of amplifier 19 may in addition be controlled automatically by an exhaust temperature sensor in order to compensate for changes in the apparent opacity caused by any variation in this temperature.

The opacimeter described with reference to the accompanying FIGS. 1, 2a, 3a and 4a has a number of advantages over opacimeters previously in use. It avoids the need of a sampling technique. Furthermore, by the use of chopped light, immunity to the effects of changes in ambient light is provided together with comparative independence from fatigue and temperature of the photoelectric cell. As a consequence, only a short warm-up period is necessary. Furthermore, consequent upon the light chopping, the use of an a.c. signal simplifies the problem of stable amplification and eliminates the effect of d.c. drift in the pre-amplifier.

A particular advantage of the opacimeter is the capability of making either continuous measurements or measurements of smoke peaks. Thus, irrespective of the response time of the indicating milliammeter 22, a peak reading can be measured with a response time of less than 10 milliseconds, held electronically, and displayed on the milliammeter 22 indefinitely.

Perhaps the greatest advantage of the opacimeter described herein is that the scale factor can be readily adjusted to give any desired sensitivity of measurement by the simple adjustment of the gain of the d.c. amplifier 19. This design feature enables the production of two distinct versions of the opacimeter, both of which may have any chosen full scale value of opacity. The first version would be for general test purposes including measurement of high density smoke values, and the values of opacity would be obtained from tabulated values corrected for path length and temperature by using an arbitrary 0–100 meter scale. The second version would be a simplified roadside test instrument that would have a near linear scale of light-absorption coefficients from 0 to about 4.0 for those fairly thin smokes that are within the limiting values that have been suggested by, for example, the United National Economic Commission for Europe and the European Economic Community (The Official Journal of the European Communities Aug. 20, 1972 No. L190. Council Directive 72/306/EEC).

Finally the essential techniques of measurement and the electronic devices described in this patent application could be adapted with equal effectiveness to the improvement of opacimeters operating with unchopped light; but the inherent disadvantages of using unchopped light, such as sensitivity to ambient light, would still present design problems.

Throughout the specification reference has been made to light. However the principles of the invention are readily applicable to electromagnetic radiation outside the visible spectrum.

Furthermore by "chopping" it is intended to cover means for modulating the light source which operate by switching the light source at the required frequency.

I claim:

1. An opacimeter comprising a source of light, means for chopping the beam of light; a photoelectric cell arranged to receive the chopped beam; means for causing the smoke, the opacity of which is to be measured to pass between the source of light and the photoelectric cell; means for removing from the output of the photoelectric cell any d.c. level which may be caused by ambient light to produce a resultant a.c. signal, a variable gain amplifier for amplifying the resultant a.c. signal to produce an amplified signal, means for smoothing and rectifying the amplified signal, a variable gain differential amplifier having an output and two inputs with one input connected to the smoothing and rectifying means and a reference voltage source connected to the other input, a potentiometer connected to said differential amplifier for setting the gain of said differential amplifier to provide any desired value of scale magnification, a hold device having an input connected to the output of said differential amplifier, a meter, and switch means for connecting the output of said differential amplifier either directly to said meter or to said meter via said hold device.

2. An opacimeter as claimed in claim 1, and including means responsive to the temperature of the smoke, the opacity of which is being measured to control the gain of said differential amplifier in respect of said temperature.

3. An opacimeter as claimed in claim 2, wherein the light source is a tungsten halogen lamp and the photoelectric cell is a selenium photovoltaic cell.

4. An opacimeter comprising a source of light, means for chopping the beam of light; a photoelectric cell arranged to receive the chopped beam; means for causing the smoke, the opacity of which is to be measured to pass between the source of light and the photoelectric cell; a potentiometer connected to said photoelectric cell for attenuating electrically the output of said cell to provide calibration; means for removing from the output of the photoelectric cell any d.c. level which may be caused by ambient light to produce a resultant a.c. signal, a variable gain amplifier for amplifying the resultant a.c. signal to produce an amplified signal, means for smoothing and rectifying the amplified signal, a variable gain differential amplifier having an output and two inputs with one input connected to the smoothing and rectifying means and a reference voltage source connected to the other input, a hold device having an input connected to the output of said differential amplifier, a meter, and switch means for connecting the output of said differential amplifier either directly to said meter or to said meter via said hold device.

* * * * *